(12) United States Patent
Boltshauser

(10) Patent No.: US 7,765,842 B2
(45) Date of Patent: Aug. 3, 2010

(54) METHOD AND DEVICE FOR APPLYING A FILM PIECE TO A CAN BODY

(75) Inventor: Werner Boltshauser, Bütschwil (CH)

(73) Assignee: Crebocan AG, Butschwil (CH)

( * ) Notice: Subject to any disclaimer, the term of this patent is extended or adjusted under 35 U.S.C. 154(b) by 1115 days.

(21) Appl. No.: 10/542,504

(22) PCT Filed: Jan. 9, 2004

(86) PCT No.: PCT/CH2004/000004

§ 371 (c)(1),
(2), (4) Date: May 1, 2006

(87) PCT Pub. No.: WO2004/065273

PCT Pub. Date: Aug. 5, 2004

(65) Prior Publication Data

US 2006/0237118 A1    Oct. 26, 2006
US 2008/0271834 A9    Nov. 6, 2008

(30) Foreign Application Priority Data

Jan. 17, 2003    (CH) .......................................... 64/03

(51) Int. Cl.
B65C 3/06     (2006.01)
B23P 19/02    (2006.01)
B65C 3/12     (2006.01)

(52) U.S. Cl. ............................ 72/58; 29/235; 29/421.1; 72/57; 72/62; 53/291; 53/292; 156/84; 156/86; 156/218; 156/423; 156/443; 493/306

(58) Field of Classification Search .................. 29/235, 29/421.1; 156/84, 86, 218, 423, 443; 493/306; 53/291, 292; 72/57, 58, 61, 62

See application file for complete search history.

(56) References Cited

U.S. PATENT DOCUMENTS

| 3,767,496 A   | 10/1973 | Amberg et al. |
| 3,802,942 A * | 4/1974  | Amberg et al. ............... 156/443 |
| 3,865,662 A   | 2/1975  | Segal |
| 3,952,676 A   | 4/1976  | Rockefeller |
| 4,199,851 A * | 4/1980  | Doherty ........................ 29/235 |
| 4,250,798 A   | 2/1981  | Yamato et al. |
| 4,416,714 A * | 11/1983 | Hoffmann .................... 156/86 |
| 7,582,176 B2* | 9/2009  | Panzetti ....................... 156/84 |

FOREIGN PATENT DOCUMENTS

DE    197 16 079 A1    4/1998

OTHER PUBLICATIONS

International Search Report.

* cited by examiner

*Primary Examiner*—David B Jones
(74) *Attorney, Agent, or Firm*—Harness, Dickey & Pierce, P.L.C.

(57) ABSTRACT

The invention relates to a method for producing a can body (2) which is characterized in that a film piece (3c) is cut from a film web (3b), said film piece (3c) is wound up on a winding spindle (7) from its front edge to its rear edge and is maintained on the winding spindle (7) so that it somewhat overlaps. The film piece (3c) is transferred from the winding spindle (7) to a concave inner surface (11a) and the film areas of the front edge and the rear edge resting against each other are sealed with each other on the concave inner surface (11a) in the area of overlapping (14). According to the invention, a closed film piece (3d) can be transferred without complication onto a can body (2), thereby conferring on the can body (2) the function of the stable structure and on the film piece (3d) the function of the décor or the inner barrier in such a manner that both functions can be optimized in a substantially independent manner.

20 Claims, 6 Drawing Sheets

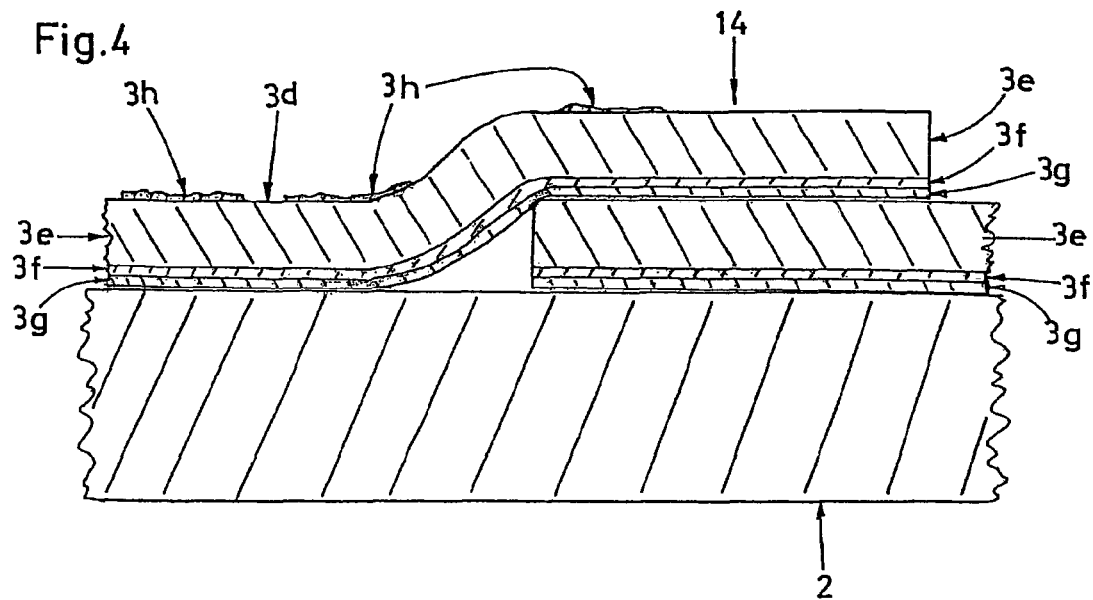
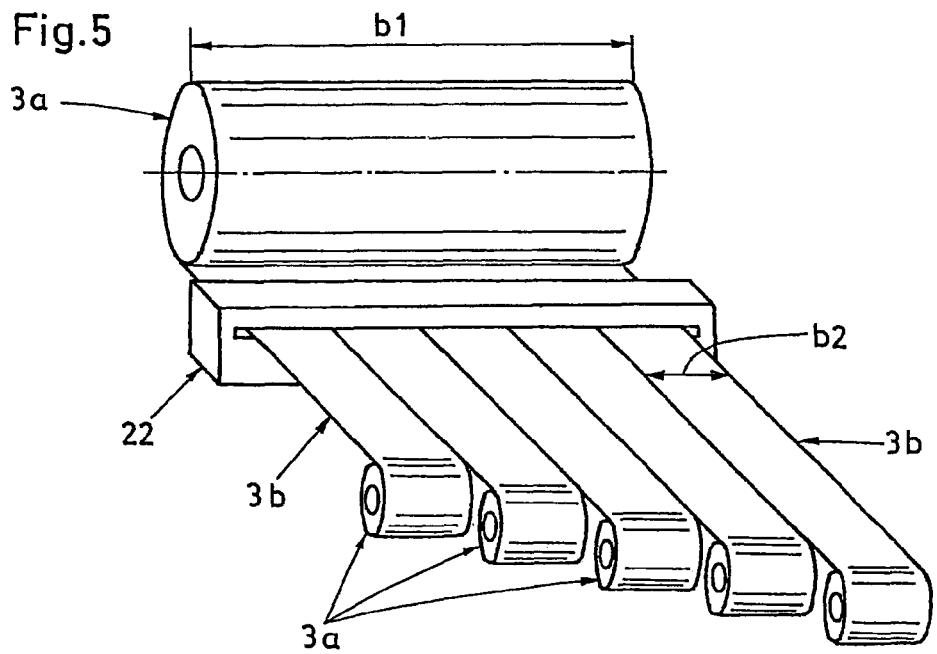

METHOD AND DEVICE FOR APPLYING A FILM PIECE TO A CAN BODY

This application is the national phase under 35 U.S.C. §371 of PCT International Application No. PCT/CH2004/000004 which has an International filing date of Jan. 9, 2004, which designated the United States of America and which claims priority on Swiss Patent Application number 64/03 filed Jan. 17, 2003, the entire contents of which are hereby incorporated herein by reference.

FIELD

The invention generally relates to a method, to a device, and/or to a can body.

BACKGROUND

For simplifying the production of containers, particularly of aerosol cans including a decoration, some individual treatment steps of the current production methods can be simplified or, in some cases, omitted or replaced. For example, a method is known from WO 95/34474 wherein one can substantially do without imprinting and overpainting of the outer surface of a container. The decoration is imprinted onto a film, and the film is then applied to the outer surface of the container.

By applying the decoration in the form of a film, various advantages are achieved. First, it is no longer required to run all operations necessary for the production of a container immediately one after the other. The printed film can be bought in completely imprinted form and does not need to be printed within the can production plant. One can economize in the cleaning procedure, because the application of a ready, sheet-like layer is less delicate than lacquering, particularly with respect to possible fatty residues. A further economization is obtained by omitting drying procedures. By omitting various parts of an installation, investment costs are also reduced.

Approaches where a label is wound around and fixed to a container have the disadvantage that arranging and fixing cannot be made very precisely. Such a label film does not adhere equally well in all places on the container so that the film can, in some cases be torn off. Residues of adhesive in the overlapping zone and insufficient engagement on the container result in an unattractive appearance.

According to other approaches, closed shrink films are shrunk on the containers. If a hose-shaped intermediate product or sleeve is produced from a printed shrink film, a film ribbon has to be wrapped around in such a manner that the two lateral margins meet each other in an overlapping manner. The overlapping lateral margins are interconnected by way of an applied adhesive. The closed ribbon is pressed flat, and is rolled up with two lateral folding lines. When producing a hose-like film ribbon, there will occur peripheral inaccuracies.

In addition, the adhesive used results in optical deficiencies, and the two foldings, which result from pressing flat and rolling up, remain visible on the container. Since the shrinking capability of a film hose is increased in its longitudinal direction, a hose portion applied to a container would shrink more in the direction of the container's axis than in peripheral direction, which renders a precise engagement of the film hose more difficult. In order to be able to guarantee sufficient shrinking also in peripheral direction, a thick film had to be chosen, which involves higher costs and an undesirable high step in the overlapping zone.

Apart from various can shapes, various methods for producing can bodies are known. In the case of one-part aerosol cans of aluminum, the cylindrical can body is provided by cold sinking. Subsequently, a valve seat is formed at the open end by jolt-necking. U.S. Pat. No. 4,095,544 and EP 0 666 124 A1 describe the production of weldless steel cans. In doing so, the cylindrical can body is produced by stamping, pressing and flow turning a steel sheet coated with tin or with plastic material.

Very current are also cans from steel sheet material, where the shell includes a longitudinal weld seam. The bottom and the upper closing are fastened to the shell by folded seam connections. From documents EP 200 098 A2 and EP 208 564, two part cans and multi-part cans are known, where the parts are interconnected by laser welding. Due to the various shapes and the extremely thin can wall of the individual types of cans, it is not suitable to wind the decoration film directly onto the can body, and to connect it to form a closed film envelope on the can body.

Connecting the film ends by way of an adhesive would be too expensive and would not satisfy both with respect to strength and esthetical aspects. To interconnect the film ends by a sealing connection, the sealed surface had to be pressed against the can body which is not suitable with thin cans due to the small strength. With cans, whose outer surface is narrowed at the lower end and particularly at the upper end or which deviate from a cylindrical shape, the sealing connection could not be attained over the whole height of the can.

From the documents U.S. Pat. No. 4,199,851 and DE 197 16 079, solutions are known where a shrinkable flat plastic material is wound around a winding mandrel, is formed to closed envelopes, are slipped upwards in axial direction onto bottles as an all around label and are shrunk on. The all around labels have to have sufficient stability in order to be able to be moved by an annular part pushing the lower edge upwards up to a label region of the bottles. This is only possible if using plastic material of great thickness.

From EP 397 558 A1, a solution is known, wherein all around labels are clamped by two partially annular pincers portions against an inner part, and are drawn downwards over a bottle. Since the all around label has to be drawn over the solid inner part and over the bottle due to the static friction at the pincers portions, this solution too can only be applied with extremely strong or thick all around labels, whose inner surface, in addition shows good sliding properties.

In accordance with EP 547 754 A2, all around labels are tentered from the inner side and drawn over a bottle by holding rods oriented in parallel and moved in radial direction. Tentering by rods, which press to outside, is only possible with sufficiently robust, and thus thick, films. Thin films would be deformed and/or damaged.

In order to reduce friction on the bottle, air is blown out of the rods. When a desired position relative to the surface has been reached, pincers-shaped grippers, that are moved from outside, have to clamp the all around label so that the rods arranged in the interior can be pulled out without displacing the all around label. The transfer of all around labels onto bottles, known from the prior art, is expensive and not suited for thin films.

Since labels on bottles extend only over a middle zone, the bottles may be held without any problem in an upper or lower region, preferably at a thread at the opening, when applying all around labels. If a film is applied as a decorating layer onto a can, the film has substantially to cover the whole area of the external surface so that holding, as with bottles, is not possible.

In order to arrange a closed film envelope on a can body, the leading edge, according to EP 1 153 837 A1, is held on a winding mandrel. After winding up the film piece, the trailing edge of the piece of decorated film should overlap the leading edge. In the overlapping zone, a narrow sealing surface extending parallel to the longitudinal axis of the can is moved radially inwards and towards the winding mandrel.

In order to enable a sealing connection in the overlapping zone, the film pieces have to be printed and cut in such a manner that a non-printed area exists at the leading edge, and in some cases at the trailing edge. In the non-printed area, the sealing layers formed on both sides of the plastic film should coincide and form a firm connection after sealing.

Now, it has been found that with plastic films after printing, due to their elasticity, the presence in certainty of narrow, non-printed areas at the leading edge, and in some cases at the trailing edge cannot be guaranteed. The reason is that the films as long webs have to be unwound from coils when printing and cutting. The force necessary for unwinding varies from the beginning of the coil to the end. Therefore, the elongating force acting on the film varies too, which leads to the above-mentioned inaccuracies. If the non-printed area were enlarged for compensating the inaccuracy, there would be an undesirable longitudinal strip without any decorating layer on the can body provided with the film.

When the sealing surface, which extends parallel to the longitudinal axis of the can, is moved radially inwards and towards the winding mandrel, it is difficult to ensure equal contact pressure along the whole sealing surface. Since the can body has to be associated to the winding mandrel at one front side for transferring a film envelope, the winding mandrel can only be supported at one front side. Due to the one-sided support, a small tilting excursion of the winding mandrel away from the sealing surface will result when pressing the sealing surface on.

A small sliding movement caused by it between the winding mandrel and the sealing surface as well as the contact pressure that changes in direction of the axis of the winding mandrel can lead to a draft, in some cases to undulating in the overlapping and sealing area and to insufficient sealing. This may affect the esthetic effect of the decorated film even after transfer and shrinking on the can body. Moreover, it has been found that pressure lines or moulds of the lateral marginal lines of the sealing surface may occur in axial direction of the winding mandrel at both sides of the sealing surface, which are even visible on the can body.

With the thin decorated films mentioned in EP 1 153 837 A1 having a thickness of less than 25 μm, preferably between 9 μm and 21 μm, great problems arise when sliding the closed film envelopes from the winding mandrel to the can body. The commercial plastic film Label-Lyte ROSO LR 400 of Mobil Oil Corporation able to be imprinted, as suggested, includes a thin sealing layer on both sides and is available with thicknesses of 20 μm and 50 μm.

When sealing the overlapping area, the sealing layer engaging the winding mandrel is also heated and is pressed to the winding mandrel. In order to avoid that the cylindrical closed film on the winding mandrel is sealed to the winding mandrel, the sealing layer and the outer surface of the winding mandrel have to be provided in such a manner that they do not adhere to each other after a sealing procedure.

Nevertheless, the adhering and sliding properties are somewhat different in the area of the sealing seam as compared with the other film areas. This may lead to problems when moving the film envelopes from the winding mandrel to the can body. If a partial area of the film envelope slides a little bit less well from the winding mandrel to the can body, it may jam on the winding mandrel or on the can body.

Further problems may arise due to electrostatic charges and the electrostatic forces involved which act onto a film. Therefore, the transfer of a cylindrical closed film from a winding mandrel to a can body is problematic, even if the diameter of the winding mandrel is a little bit larger than the diameter of the can body. A significant difference in size is not desirable, because in this case the ability of the film to shrink has to be larger so that there is the risk of undulating when shrinking. For increasing the shrinking ability, a film of an elevated thickness has to be used, which is not desirable.

SUMMARY

Therefore, at least one embodiment of the present invention includes an object of finding an approach by which one can optimally imprint film envelopes of different films, particularly also of thin films, according to the needs, and to transfer them from a winding mandrel to a can body.

The term "can body" should be understood to encompass all containers, particularly container-like intermediate products. When solving the task, a method of at least one embodiment for imprinting film webs has been invented which is novel and inventive for imprinting label webs, irrespective of the production of cans.

When solving the problem, in a first inventive step it has been recognized that interconnecting the film piece to form a closed film envelope should not be made on the convex outer surface of a winding mandrel. A winding mandrel is adapted to convert the film piece into the shape of a cylindrical surface, the trailing edge of the decorated film piece, after winding the film piece up, overlapping the leading edge in an overlapping area. For achieving a perfect sealing connection and for simply transferring a closed film envelope to a can body, a concave inner surface, engaged by at least a portion of the film including the overlapping area, is better adapted.

The contact force, necessary for achieving a sealing connection between a concave contact surface in the form of a partial surface of the concave inner surface and a convex contact surface in the form of a pressure ledge, may be absorbed by a support of an actuation device for the pressure ledge provided during pressing on the concave inner surface directly by an engaging part, for example a tubular part on the concave inner surface. The pressure ledge is, for example, arranged directly on the winding mandrel. The pressure force, due to the support, need not to be absorbed through a one-sided support of the winding mandrel, thus being substantially equal or constant over the entire height of the overlapping area.

In addition, the concave inner surface may be pushed together with the film envelope over a can body without any jamming problem, and the can body can be introduced, after removing the winding mandrel or the convex pressing surface, into the concave inner surface and the film envelope held on it. In this position, the film envelope may be transferred by a shrinking procedure from the concave inner surface to the peripheral surface of the can body. Optionally, it is only a small annular area is shrunk to the can body so that it is guaranteed that the film envelope remains on the can body and the can body may be subjected to a shrinking procedure separated from the concave inner surface, which ensures a non-undulated engagement of the can body. This shrinking procedure can, for example, be effected in a furnace.

In a second inventive step it has been recognized that the pressure ledge, being displaced outward in radial direction, has not to supply any heat when performing the sealing connection at the concave inner surface, so as to be able to be designed for a non-adhering contact and an optimum pressure. Since the inner side of the film envelope, subsequently to forming the connection in the overlapping area, is sealed to the can body, it has to have a sealing layer on the inner side. Therefore, the pressure ledge moved to the exterior engages a sealing layer when forming the connection. The area of the sealing layer used for obtaining the connection is situated within the overlapping area on the inner side of the outer film layer or the trailing edge.

In order to ensure that this area of the sealing layer is first subjected to a sealing procedure, heat should be supplied, for example from a good heat conductive partial surface of the concave inner surface. In correspondence, the pressure ledge moved to the exterior can be designed in such a way that it does not adhere to the sealing layer, and that it does not leave moulds by pressure. Thus, it may be broader than the overlapping area and/or resilient and/or may be formed of a material that is unable to form an adhering connection with the sealing layer.

The concave inner surface is, for example, formed by a circular cylindrical tubular part or a tubular holding element, and a cylindrical winding mandrel includes in a first peripheral section a pressured ledge, and optionally in at least one second peripheral section, which is in particular offset by 180° relative to the first one, a propping ledge. After a film piece has been wound around the winding mandrel and the winding mandrel is arranged within the tubular element, a transfer step is performed in which the film piece, preferably by a difference of pressure, is transferred from the convex outer surface of the winding mandrel to the concave inner surface of the holding element. To this end, air is directed, for example, from outlet openings on the outer surface of the winding mandrel towards the film piece and/or a negative pressure is produced through openings on the inner surface of the tubular piece.

When transferring the film piece from the winding mandrel to the holding element, the film piece is displaced through a narrow annular space. In this way, the circumference is a little bit increased, and correspondingly is the overlapping area a little bit reduced.

Due to the increase of circumference, when transferring, the trailing edge is moved relative to the leading edge in which way the wrinkle-free engagement of the two film ends in the overlapping area is still improved. When now the pressure ledge is moved to the overlapping area, a smooth engagement and a precise interconnection can be ensured.

In order to supply the heat necessary for sealing substantially only the overlapping area, a heating ledge is formed, for example, on the holding element to which an insulated zone joins on each of its sides in peripheral direction. The temperature of the heating ledge is adapted to the sealing layer or its sealing temperature, to the heat conduction of the film and to the time provided for sealing.

Having established the sealing connection in the overlapping area, the winding mandrel and the holding element together with the closed film envelope are moved towards each other in axial direction. Subsequently, a relative motion is effected in axial direction between the can body and the holding element with the closed film envelope so that the film envelope is arranged around the can body. In order to bring the film envelope in a holding contact with the can body, at least in an annular area, a shrinking procedure is started at least in an annular area. To this end, hot air, for example, particularly from one front side of the can body or of the holding element, may be introduced into the annular space between the can body and the holding element.

The hot air has to heat the annular area of the film envelope up to a temperature in which the shrinking procedure is effected. Since the shrinking temperature is higher than the sealing temperature, a firm sealing will, in some cases, directly be achieved when contacting the can body. If firm sealing should substantially be effected only after engagement of the film envelope on the can body, it is optionally suitable to supply heat, particularly hot air, from the holding element to the film envelope or an annular area of it.

If the film should extend in the bottom region of the can body somewhat beyond the bottom, it may extend after shrinking at least up to an outer annular region of the can bottom. In the case of can bodies having a base in this outer annular region, the base is occluded by the engaging film so that the base, even in the case of use of oxidizing can material, is protected against oxidizing.

In order to ensure that the film remains always on the region of its lower edge on the can body, optionally an external base covering is arranged on the base in such a manner that it overlaps the edge of the film. Optionally, this base covering extends up to the peripheral surface of the can body, thus occluding the base so that it prevents occurrence of corrosion problems. The flat material is fixed to an annular connection area of the can body. If the connection is formed along a closed circular line, the membrane-like base covering will have a high stability.

A main area of the base covering, which is surrounded by an annular connection area, is for example substantially flat and includes preferably a bar code imprinted. If the bar code can be applied to a substantially flat base surface, no bar code is necessary on the can's wall, and any impairment of the design possibilities of the can's wall is prevented. Furthermore, no printing rollers for a bar code are necessary when printing a decoration of the can's wall. Thus, large quantities of can bodies having an attractive standard decoration on the can's wall can be produced.

A changing information or an information which is not the same for all countries, such as a bar code or the filling date and/or an esthetically interfering information are printed to the base covering. These, optionally differing base coverings may be printed shortly prior to the filling moment of individual product batches and may be fixed to a standard can body. In this way, the same can may be used for all countries and all filling batches.

Since the base covering can be made flat in the area of a bar code, the bas code can be better read than a bar code applied to a curved can wall. If the coating of the outer surface of the can body in form of a decorated film extends up to the outer edge of the base covering, one may prevent that the metallic edge at the lower can end is visible.

The base covering is preferably made in form of a flat plastic material. It goes without saying that flat material having at least one metal layer, particularly an aluminum or steel layer, or even with a layer of cardboard, can also be used. The stability conferring layer may optionally be coated with plastic material.

The flat material used should ensure a robust base covering which is not damaged in the conveyor devices of bottling installations and remains resistant even when standing on a wet base. The flat materials mentioned above may all be provided with a sealing layer to be firmly sealed at the bottom. Instead of a sealing connection, optionally a catch connection or a welding connection, particularly comprising at least three laser welding points, may be provided. If a magnetizable base covering is used, it may enable conveying by way of magnet conveyors, even with can bodies of non-magnetizable material.

Since the movements between the winding mandrel and the holding element involve a large stroke when bringing them together in axial direction, the holding element may optionally be formed at least of a partial tube or a half-tube so that bringing together can also be effected by a movement transversely to the axial direction of those parts. To ensure, nevertheless, a substantially complete surrounding of the winding mandrel, the holding element includes, for example, at least two segments of a tube which can spread out in opposite directions or are pivotally interconnected. After moving the winding mandrel and one segment together, the at least one further segment may be furnished or pivoted to them. For separating the winding mandrel from at least two segments of the holding element, by which the now closed film envelope is held, a movement has to be executed in axial direction.

The method described above can particularly advantageously be used when utilizing a film that is imprinted, in some cases, on its outer side or front side, but preferably on the side facing the can body or the back side. With a transparent film printed on the back side, the printed layer is protected by the film so that no impairment of the decoration caused by friction can occur. A transparent film printed on the back side may be provided after printing with a sealing layer which ensures a firm sealing connection between the film and the can body as well as between the film margins in the overlapping area even through the printed layer. One can do without a non-printed area and precise cutting that involves some problems. Since printing can be effected up to the cutting line or universally, no non-printed peripheral areas will be present on the can body.

In some cases it is advantageous, if the printed layer on the film's back side takes substantially over the function of a primary coat, and the remaining decoration is printed onto the front side of the film. If now, the term primary coat is used, this may either be a uniform flat color or even part of the decoration, for example a two-dimensional color or image design. The film web preprinted on its back side in a first printing plant will be imprinted on its front side in a further printing step.

This further printing step can, optionally, be effected at the can producers or in another printing plant in order to apply specific decoration information. Accordingly, for example, in addition to a basic decoration, an inscription is applied in a further printing step which may be different for the respective sales area. For printing the front side, any printing method known in the art may be used, optionally together with some surface treatment carried out after printing.

Advantageously, a printing step of transfer process may be used for printing film webs. When doing this, at least one, but preferably different colors, reach a transfer surface, and from the transfer surface they reach in one step the film. This transfer process can be used for the front or the back side of the film or for both sides, and can be used independent from the use of a film described in the context of the present invention, particularly for labels too in a novel and inventive and advantageous manner.

A similar printing process is known from U.S. Pat. No. 4,245,583 for printing collapsible tubes, cans or bowls. For printing webs, only methods have been used up to now, wherein the different colors have been applied one after the other, and have been dried between the application stations. Due to the large length of webs, those skilled in the art had the opinion, printing and drying in subsequent stations is always suitable.

Articles, in contrast, are considered differently, because due to their short peripheral length no more than one printing station can be arranged at their periphery. Between two printing operations, the articles have to be passed through a drying device. Regarding printing webs, a prejudice had to be overcome by the embodiments of the present invention.

According to the prior art, thin films are moved through a plurality of printing zones, each having a printing group and a drying device, which involves great expenses as to devices and energy. In addition, the partial prints of the individual printing groups have precisely to coincide which involves great problems due to the elasticity of thin films. Up to the moment when the partial prints of the different printing groups do coincide exactly, there is a great loss of material. Moreover, a minimum change of the elongation of film may displace the superimposition during printing operation. Therefore, one has to provide an expensive monitoring facility and a correction control.

If now the different partial prints are applied wet on wet onto a transfer surface, for example a rubber blanket or a transfer cylinder, the whole printed image can be transferred to the film in one step and, thus, without any coincidence problem. It is merely a transfer group and a drying device which is needed. Particularly advantageous is this front sided transfer print with a transparent film which shows a primary print on the backside.

Due to the primary print, it is only a small area of the transfer surface which has to be provided with different colors, which prevents undesirable effects of the wet on wet application of color onto the transfer surface. In the case of a film web, a qualitative high ranking decorated film for labels and/or an outer layer of a can be provided at small expenses and without any transfer problem, for example by printing the backside in at least one rotogravure step and the front side in a flexo printing step.

Since the two printing steps can be effected separately, there is a great range with respect to different small quantities. This is advantageous also for labels, because in this way one may supply to the various filling firms of a product or to the consumers of a label a film coil showing a primary decoration on the backside of the film, and the filling firm or consumer may apply different prints on the front side of the film prior to using the labels.

Further decorative effects can be obtained with the shrinkable closed film envelopes according to at least one embodiment of the invention. For example, at least one structure element may be arranged on the outer surface of the can body prior to shrinking firmly the film on. The structure element is held by the film envelope, and the surface structure of the structure element may be recognized or is perceptible through the film. For example a nap ring may be fixed to the can body prior to application of the decorated film.

In the case of can bodies produced from flat material, particularly metal sheet, the structure may be stamped directly into the flat material so that one can do without arranging a structure element. The decorated film may be left transparent in a partial area so that the structure element or, optionally, the surface of the can body remains visible. If a structure element does not extend around the can body, the structure element may be arranged on the winding mandrel prior to winding up the film piece. Having wound up the film piece, the structure element is on the backside of the film, can be held on the film piece with a small adherence force, may be moved to the concave inner surface and, after introduction of the can body, towards the latter together with the shrinking film.

Transfer of the wound up film piece from the winding mandrel to a concave inner surface and subsequent formation of a sealing connection may also be used for providing an inner layer of the can in the form of a film. To this end, a winding mandrel, after winding up a film piece, is moved into the interior of a can body. By supplying pressurized air between the winding mandrel and the film piece and/or by moving at least an area of the circumferential surface of the winding mandrel outwards in radial direction, the film piece may be brought towards the concave inner surface of the can body at least in some areas.

In some cases, a negative pressure is created radially outside the film piece from one front side between the inner wall of the can and the film piece so that the film piece engages the inner wall of the can body due to the negative pressure or due to the pressure difference between the partial spaces at both sides of the film piece. The length of the film piece is chosen in such a manner that the film piece engaging the can wall has an overlapping area. If now heat is supplied, in some cases, to the film through the wall of the can body, and the film includes a sealing layer at the side facing the exterior, a sealing connection to the can wall may be obtained, for example, at least in the overlapping area, and preferably also a sealing connection between both film layers.

In order to seal the film firmly in a manner as extensive as possible to the wall of the can body, the film is pressed to the wall by way of an overpressure and/or by at least one pressing surface, and heat is supplied substantially through the entire peripheral wall or, optionally, also from the interior of the can. Preferably, the convex pressing surface of a pressing ledge presses from the winding mandrel against the overlapping area.

Since the development of plies is not disturbing in the can's interior, even a one-sidedly supported sealing ledge could be pressed against the overlapping area. In order to obtain an occlusion formed by the film even towards the can's bottom, the wound film piece is made protruding, for example, beyond the end face, and is closed prior to insertion into the can body by shrinking or turning, this closure being not able to engage closely the can's base due to undulations. However, optionally a further film piece is introduced into the can body at one front side of the winding mandrel and is fixed to the can's bottom, the film piece assigned to the wall and that assigned to the base being preferably tightly interconnected. This can be obtained, for example, by way of a sealing element to be pressed against the annular contact area between the two film pieces.

By transferring a closed film envelope, according to at least one embodiment of the invention, to the can body without any problem, it is possible to assign the function of a stable structure to the can body and the function of a decoration or of an inner barrier to the film envelope in such a manner that both functions may be optimized substantially independently from one another.

The winding mandrel may be designed in such a way that the film adheres to the winding mandrel at least in the region of the leading portion of the film, and the film is able to be wound precisely around the mandrel. For attaining such an adherence, the interior of the winding mandrel communicates preferably with a negative pressure device, fine holes leading through the peripheral wall of the winding mandrel so that the film is held in the region of the holes by negative pressure. It goes without saying that the film may also be held to the winding mandrel by way of electrostatic adherence forces or, optionally, by a mechanical device/method.

The treating station for applying the decorated film is preferably equipped with a turntable. A winding mandrel and at least one holding element having a concave inner surface is associated to each can place. A film piece is cut from a film web and is wound to a winding mandrel, the leading edge and the trailing edge of the film piece being held somewhat in an overlapping fashion on the winding mandrel.

After transfer to a concave inner surface, the film piece may be sealed in the overlapping area and may be firmly shrunk to the can body. Since shrinking and sealing is obtained by the influence of heat, it is suitable if the temperature necessary for sealing is a little bit below the minimum temperature for shrinking. Having applied a sealing layer, the sealing procedure may be effected at a temperature of about 130° C. Shrinking of the film ROSO LR 400 known in the prior art begins, however, only at a temperature of at least 140° C.

In order to prevent that the film displaces on the can body, at least one shrinking unit is provided at the treating station for applying the decorated film, which heats the film in such a manner that at least an annular partial area of it engages the can body so closely that the can may be moved to further treatment stations without any displacement of the film relative to the can body. In a further treating station, preferably including a turntable, the film is substantially completely shrunk to the can body. To this end, the film is heated by heat radiation and/or by contact heat, particularly with hot air, so that is subjected to the desired shrinking procedure.

The film ROSO LR 400 of a thickness of 20 μm can, for example, be shortened by shrinking at least by 18% in longitudinal direction. Now it has been shown that the film may also be shrunk onto a, already narrowed neck portion. If, however, narrowing is too extensive to engage the film onto the neck by shrinking, it may be more suitable in some cases, to carry out the entire narrowing, but preferably at least part of the narrowing, only after having shrunk the closed film on. To ensure for a narrowing step that the film is firmly connected to the peripheral wall of the can, a sealing procedure has to be carried out after the shrinking procedure, wherein the film is firmly connected to the can body at least in the region to be narrowed.

In the case of a beverage can, the adherence of the film on the can body after a shrinking procedure may already be sufficient, the film being then able to be removed from the can after cutting it open. In the case of aerosol cans, the requirements to the adherence of the film are greater.

Even after a damage or after cutting open, the film has to remain on the can body. To this end, preferably a sealing procedure is carried out after shrinking, wherein at least a partial area of the film, but preferably in the whole peripheral area, is firmly connected to the can body. The sealing layer necessary for sealing it on is arranged on the side of the film which faces the can body. Heat required for sealing reaches the sealing layer preferably through the film. Optionally, heat is transferred in an inductive way to the can body. However, pressing surfaces may also be used for transferring both heat and pressure force.

If a sealing layer is used which cannot be firmly sealed to a metal surface, it is suitable if the can body is formed by sheet metal coated with plastic material. It has been shown that a coating of plastic material on a can body of coated sheet metal is able to be extremely well connected to a sealing layer of a film.

If deforming an open can end is necessary, at least one further treatment station is provided which preferably includes a turntable to which necking devices, particularly spin-flow-necking devices, are associated. In this way treatment can be carried out during revolution of the turntable. Since, in case of spin-flow-necking devices, the treating tool and the can body are rotated relative to each other about the can axis, either the can body or the treating tool has to be able to be rotated about the can axis relative to the turntable.

In order to enable beading of the free front side of a narrowed neck portion, preferably an edge beading device is provided. The latter is assigned about to the can places of a turntable of the treatment station for deforming the open end. It goes without saying that instead of a (de)formation to a valve seat of an aerosol can, a can occlusion for beading or welding on a dome including a valve seat, or a beverage can cover may be formed.

In order to cover the upper edge of a decorated film and/or some connected to the can occlusion, an upper annular covering element may be provided. This upper covering element, in the case of aerosol cans, is optionally formed by a partial region of the valve or by a part fastened to the valve seat. It will be understood that it may also be fixed to the upper can end, in an analogous way as with the base covering, by a sealing connection, a catch connection or a welding connection, particularly including at least three laser welding points, this part overlapping the upper film end, thus protecting it against tearing off.

BRIEF DESCRIPTION OF THE DRAWINGS

The drawings explain the approach according to the invention with reference to an embodiment, wherein FIG. 4 is a cross-section of a detail of the wall of a can body comprising an engaging decorated film, FIG. 5 is a perspective view of a severing device for severing a broad film web into a plurality of partial webs.

DETAILED DESCRIPTION OF THE EXAMPLE EMBODIMENTS

Figure 1:
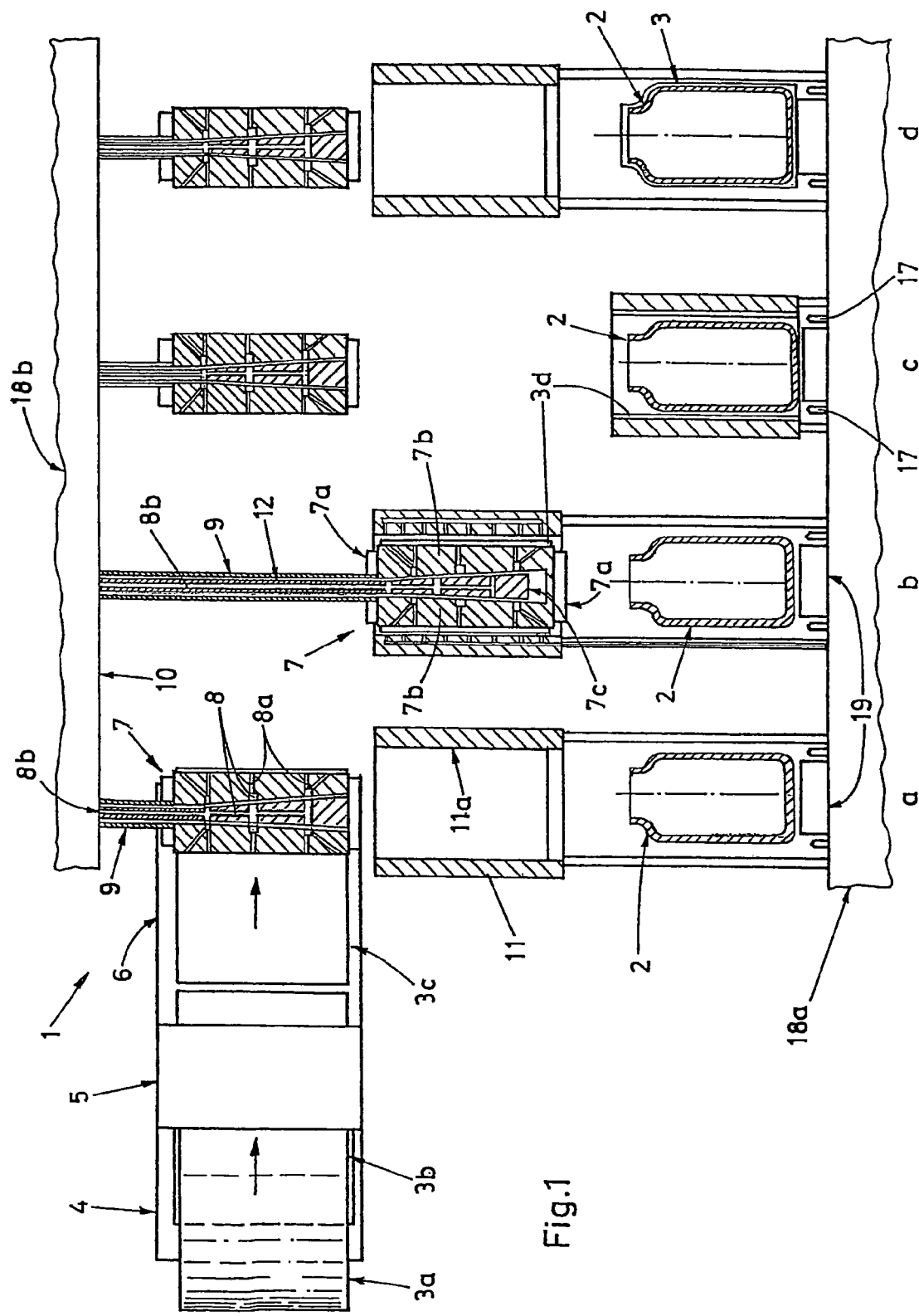
FIG. 1 is a schematic illustration of a device which transfers a piece of film from a winding mandrel to a can body by way of a holding device.

FIG. 1 shows a device 1 for applying a decorated film 3 on a can body 2. A supply device 4 supports a film coil 3a and feeds the free end of the film web 3b wound on the film coil to a cutting device 5 which severs film pieces 3c from the film web 3b.

According to situation a, the film pieces 3c are fed to a winding mandrel 7 which is, for example, ensured either by the cutting device 5 or by a carry on device 6. The leading edge of a film piece 3c is positioned on the winding mandrel 7 and is wound onto the winding mandrel 7 by rotating the winding mandrel 7 about its longitudinal axis so that an overlapping area is formed between the leading edge and the trailing edge of the film piece, wherein two film layers engage the winding mandrel. In order that the film piece 3c is held on the winding mandrel 7, the winding mandrel 7 includes preferably a hollow space 8 to which a negative pressure and, optionally even a positive pressure relative to the environmental pressure may be applied, and communication channels 8a which communicate the hollow space 8 to the outer surface of the winding mandrel 7. The negative pressure may form through the communication channels 8a between the winding mandrel 7 and the film piece 3c and may ensure the desired adherence. It will be understood that the film may also be held on the winding mandrel due to an electrostatic adherence force or, optionally, also mechanically.

In the embodiment shown, the winding mandrel 7 is arranged on a first installation part 10 by way of a rotatable holding tube 9. In the interior of the holding tube 9 is a communication conduit 8b formed from the hollow space 8 to a device for generating a negative and/or positive pressure. In order to be able to transfer the winding mandrel 7 together with a film piece wound on it to a concave inner surface 11a of a holding device 11, the holding tube 9 is displaceable along its longitudinal axis.

A holding device 11 including a concave inner surface 11a) is associated to the winding mandrel 7 in such a manner that the winding mandrel 7 may be introduced into the concave inner surface by a movement along its axis (situation b) and may be drawn out again. It will be understood that only the concave inner surface 11a may be displaceable along this axis. After winding the film piece onto the winding mandrel 7, the concave inner surface 11a would then be pushed over the winding mandrel.

Now, the overlapping area of the interengaging film areas of the leading edge and the trailing edge are sealed to each other on the concave inner surface 11a. To this end, a convex pressure surface is pressed to the outside and against the concave inner surface so that a sealing pressure and a sealing temperature are obtained in the overlapping area. The heat necessary for sealing the overlapping area is preferably supplied from the concave inner surface, particularly from a partial area of the concave inner surface.

In the embodiment shown, the winding mandrel includes guiding portions 7a on both front sides, of which at least the upper one is connected to the holding tube 9. At least two mandrel segments 7b are held on the guiding portions 7a, one of these mandrel segments including the convex pressure surface and is movable in radial direction to the outside and may be reset again. Optionally, all mandrel segments 7b may be moved in radial direction and are, to this end, guided by the guiding portions 7a.

In order to be able to press at least one of the mandrel segments to the outside, for example an actuation cone 7c is arranged in the interior of the mandrel segments 7b, the actuation cone 7c and the mandrel segments 7b to be actuated comprising each inclined surfaces, particularly partial cone surfaces, which face each other. If now the actuation cone 7c is drawn upwards by an actuation element 12, preferably a tube including the communication conduit 8b, the cooperation of the inclined surfaces results in a motion of the moveable mandrel segments 7b in radial direction to the outside. Reset of the guiding portions 7a ensures during a downward movement of the actuation cone 7c a radial inward movement of the mandrel segments.

Figure 2:
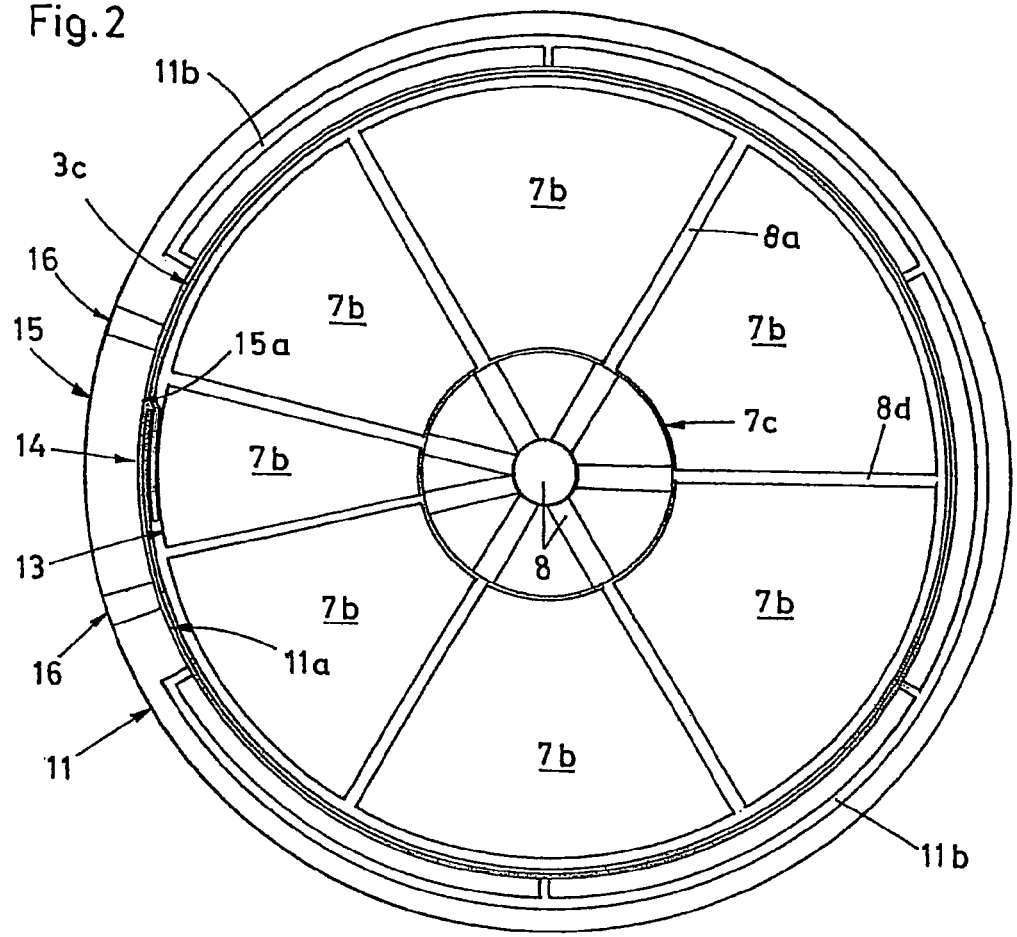
FIG. 2 shows a horizontal cross-section of the winding mandrel and a holding device.

FIG. 2 shows an embodiment wherein seven mandrel segments 7b may be moved in radial direction. Having inserted the winding mandrel 7 together with the film piece 3c into the holding device 11, the mandrel segments 7b may be moved to the outside against the concave inner surface 11a. Due to the increase in circumference, the distance between the leading and the trailing edge of the film piece 3c, i.e. the overlapping area, will become somewhat smaller, the small displacement leading to a precise engagement in the overlapping area. The convex pressure surface 13 is formed on one of the mandrel segments 7b.

The film piece 3c is positioned in such a manner that the overlapping area 14 is assigned to the pressure surface 13. The pressing force of the pressure surface, that acts onto the overlapping area 14 is transferred to the concave inner surface 11a by a support via at least one mandrel segment 7b. The convex pressure surface is preferably broader than the overlapping area and/or resilient and/or consists of a material which is unable to get into an adhering connection with the sealing layer. In this way, one can prevent pressed moulds in the film piece 3c. The heat necessary for sealing the overlapping area 14 is supplied by sealing surface 15a to be heated to the concave inner surface 11a. The sealing surface 15a is the inner surface of a sealing element 15, to which, optionally, an insulation zone 16 joins each on both sides in peripheral direction.

After sealing the overlapping area 14, the film piece 3c may be designated a closed film piece 3d. The closed film piece 3d is now transferred from the winding mandrel 7 to the holding device 11. To this end, the holding force of the winding mandrel has to be removed which, in the embodiment shown, is effected by degrading the negative pressure in the hollow space 8.

The communication channels 8a leading to the outer surface of the winding mandrel 7 are formed, according to FIG. 2, by the interspaces between the mandrel segments 7b. According to FIG. 1, however, bores can also be provided. For holding the closed film piece 3d on the holding device 11, the latter includes, for example, air channels 11b including apertures at the concave inner surface 11a. The closed film piece 3d is held to the concave inner surface by negative pressure in the air channels 11b. When the actuation element 12 is moved downwards, this results in a motion of the mandrel segments 7b inwards in radial direction by the reset device of the guiding portions 7a.

In accordance with FIG. 1, situation c, the winding mandrel 7 is moved out of the holding device 11 into the upper position, and the holding device 11 together with the closed film piece 3d is moved over the can body. By supplying heat, for example through hot air nozzles 17, the shrinking temperature may be exceeded at the lower edge of the closed film piece 3d so that at least the lower terminal area of the film piece 3d engages the can body 2.

After degrading the negative pressure in the air channels 11b, the holding device 11 is moved away from the can body 2 and upwards (situation d). Since the film piece 3d adheres now to the can body 2 in the desired position, the can body 2 together with the film piece 3d may be conveyed to a further treatment station, for example to a furnace, where the shrinking procedure is completed and, in some cases, firmly sealing the decorated film to the can body is effected. The further treatment station for carrying out the shrinking procedure supplies heat to the transferred film piece, the heat being preferably supplied in the form of radiant heat and/or contact heat, particularly by way of hot air, but optionally even inductively through the can body.

For carrying out the fastening procedure by which the decorated film is firmly sealed on the can body, at least in a partial area, a connecting device is optionally provided. Such a connecting device transfers heat to the film piece engaging the can body so that its sealing layer forms a sealing connection to the can body. In some cases, the decorated film is pressed against the can body by a pressing surface, this pressing surface being optionally moved over the can body for flattening possible plies. Heat is preferably supplied inductively through the can body, but in some cases by radiant heat and/or contact heat. Optionally the same device is used for shrinking and sealing, wherein only different treatment temperatures are provided for the two procedures.

The device for applying a decorated film is preferably built up as a turning station. In this case, a winding mandrel 7 and a holding device 11 are respectively associated to each can place, wherein these parts are preferably arranged above the cans to be treated. The turning station includes, for example, an upper turning part 18b which holds the winding mandrels 7, and a lower turning part 18a including can places 19, the hot air nozzles 17 and the holding devices 11. The can bodies are placed onto the can places by the transfer stations, and are removed again at the end.

Figure 3:
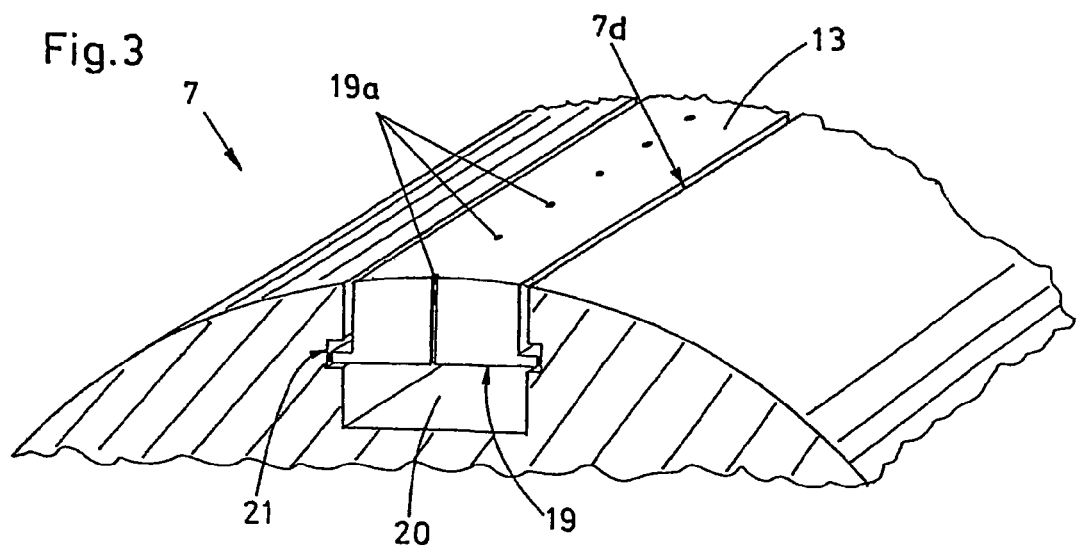
FIG. 3 is a perspective view of a detail of the winding mandrel together with a pressing surface.

FIG. 3 shows a winding mandrel 7 which includes pressing element 19 including the pressing surface 13 only instead of the mandrel segments 7b. In the embodiment shown, the pressing element 19 is moved and actuated by a guiding and stop device 21 and an actuation channel 20 by way of pressurized air.

A first position of the pressing element 19 drawn to the interior is achieved by way of a negative pressure in the actuation channel 20. A second position of the pressing element 19 pressed to the exterior is achieved by way of a positive pressure in the actuation channel 20.

Since the film piece, in the first position of the pressing element 16, has to be held engaged on the winding mandrel 7, a negative pressure, and, thus, some adherence between the film piece and the pressing surface 13 can be achieved by connection bores 19a. The leading edge of the film piece may be oriented, for example, on a stop edge 7d of the winding mandrel 7 so that the overlapping area is situated in the region of the pressing surface 13. In the second position of the pressing element 19, the film piece is pressed against the concave inner surface and needs no longer to be held on the winding mandrel 7. Release of the film is achieved by air which emanates through the connection bores 19a due to an overpressure in the actuation channel 20.

FIG. 4 shows a detail of a can body 2 engaged by an overlapping area 14. The closed film piece 3d includes a transparent film 3e having a printed coating 3f and a sealing layer located on the printed layer. The printed coating includes preferably at least one first printed layer in the form of a counter-print, and optionally a primary coat or body color at the side averted from the film, directly at the sealing layer. Preferably three, but in particular four printed layers of different colors are provided.

When using a counter-print, the printed layer is protected by the film. It will be understood that films may be used which are printed with a standard print on the side facing the exterior, wherein then, in some cases, first a body color is applied, and after the desired printed layers, preferably a protective lacquer layer. The sealing layer is then applied on the side of the film which is averted from the printed layer. After winding up the film pieces, the sealing layer engages respectively the can body 2. In the overlapping area 14, the sealing layer of the outer film end engages the inner film end. Therefore, it is suitable when forming the connection in the overlapping area 14, if heat is supplied from the concave inner surface 11a. The heat reaches then first the sealing layer 3g, which achieves the connection. The sealing layer 3g which engages the pressing surface 13 is less heated.

When using film webs which are printed at the backside with at least one body color or primary coat (counterprint), there is the possibility of applying at least one further print layer on the outer side and in some cases to apply a print layer including more than one color. The externally applied print layer 3h may be applied using any known printing method, for example my way of flexographic printing, serigraphy, rotogravure, hotstamping or digital printing. If a transfer printing process is used, a method may be employed where the desired colors are transferred to a transfer surface wet on wet one over the other. From the transfer surface, the whole print is transferred in one step onto the film. In this way, one may do without drying several times after partial prints subsequently applied.

FIG. 5 shows a broad film coil 3a', which is divided into several film webs 3b by way of a cutting device 22, the film webs 3b being wound onto film coils 3a. The broad film coil 3a' has a width b1 that corresponds to a plurality of can heights. The film webs 3a have each a width b2 which corresponds to the can height. If now the broad film coil 3a' is printed by counter-printing with a standard decoration, the small film coils 3a may be imprinted on the external side each with the locally necessary information for different countries. This specific print, according to the needs, may be carried out at different places, preferably near the respective can producers.

Figure 6:
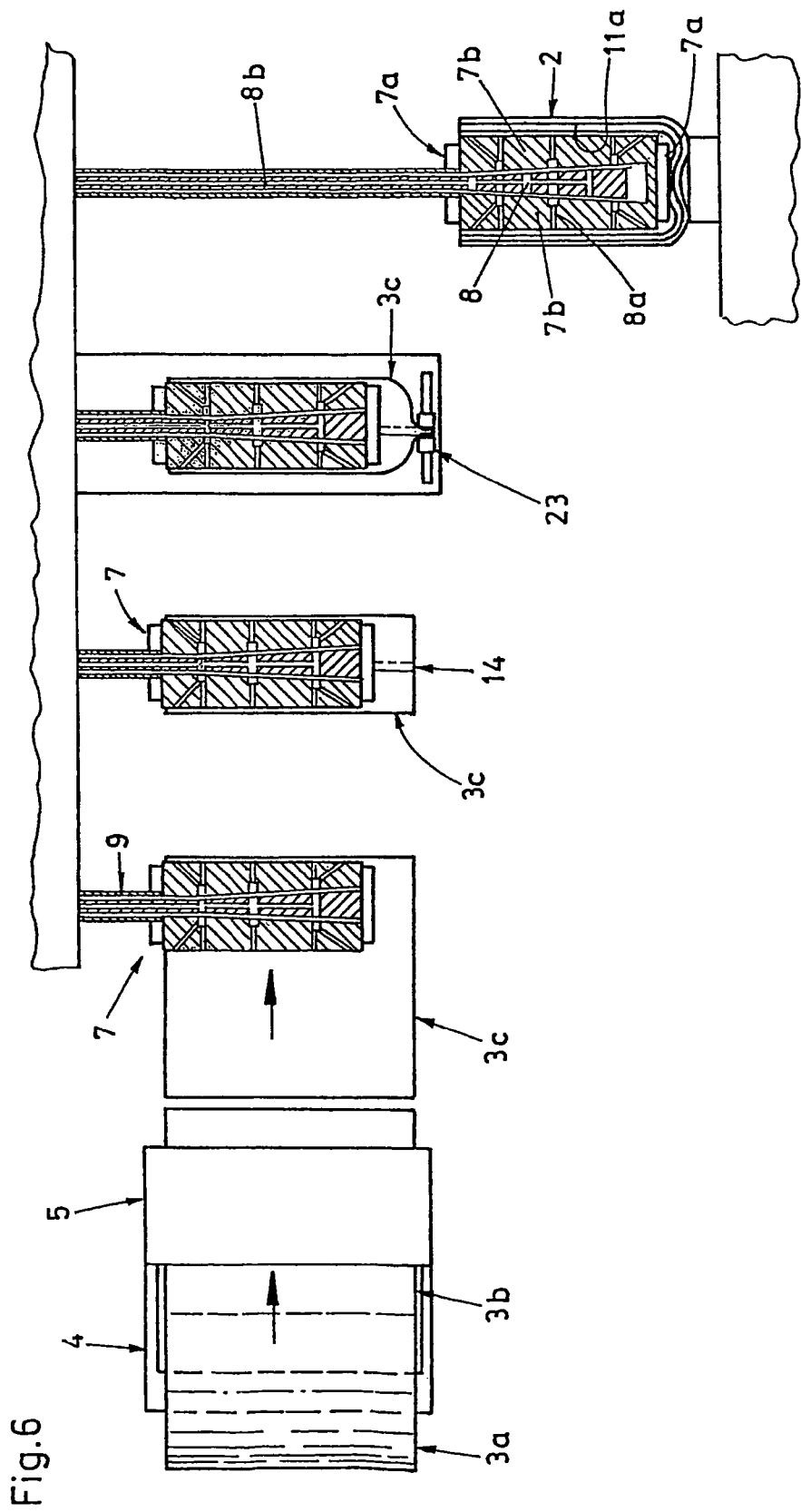
FIG. 6 is a vertical cross-section of an installation which arranges a separating film in the interior of a can body.

FIG. 6 shows an approach for transferring the wound film piece from the winding mandrel to a concave inner surface and the subsequent formation of a sealing connection, the concave inner surface being formed by the inner wall of a can body, and the film piece is used for providing an inner layer of the can. To this end, a film piece 3c is wound onto the winding mandrel 7. In order to obtain also a cover formed by the film towards the can bottom, the wound film piece 3c, for example, is allowed to project below beyond the front side, and is closed by way of a closing device by shrinking or twisting. The overlapping area 14 should, however, further remain displaceable in the region of the winding mandrel 7. Subsequently, the winding mandrel 7 together with a film piece 3c, that is closed at the bottom, is introduced into a can body 2, the lower cover being not able to engage closely the can bottom because of undulations.

By moving mandrel segments 7b, as already has been described with reference to FIGS. 1 and 2, to the exterior in radial direction and/or by supplying pressurized air between the winding mandrel 7 and the film piece 3c, at least some areas of the film piece 3c may brought towards the concave inner surface 11a of the can body 2. The length of the film piece 3c in peripheral direction is chosen in such a way that the film piece 3c that engages the can wall includes still an overlapping area 14.

If now heat is supplied to the film, optionally through the wall of the can body, and the film includes a sealing layer, a sealing connection can be obtained between the film layers, for example, at least in the overlapping area. Preferably, the convex pressing surface 13 of the winding mandrel 7 presses, as illustrated in FIG. 2, against the overlapping area 14.

Instead of the holding device illustrated in FIG. 2, the can body is used. In order to seal the film firmly to a most possible extent to the wall of the can body, the film is pressed by way of a positive pressure and/or by way of a plurality of mandrel segments 7b against the inner wall of the can, and heat is supplied substantially over the whole peripheral wall or, optionally, also from the interior of the can.

Figure 7:
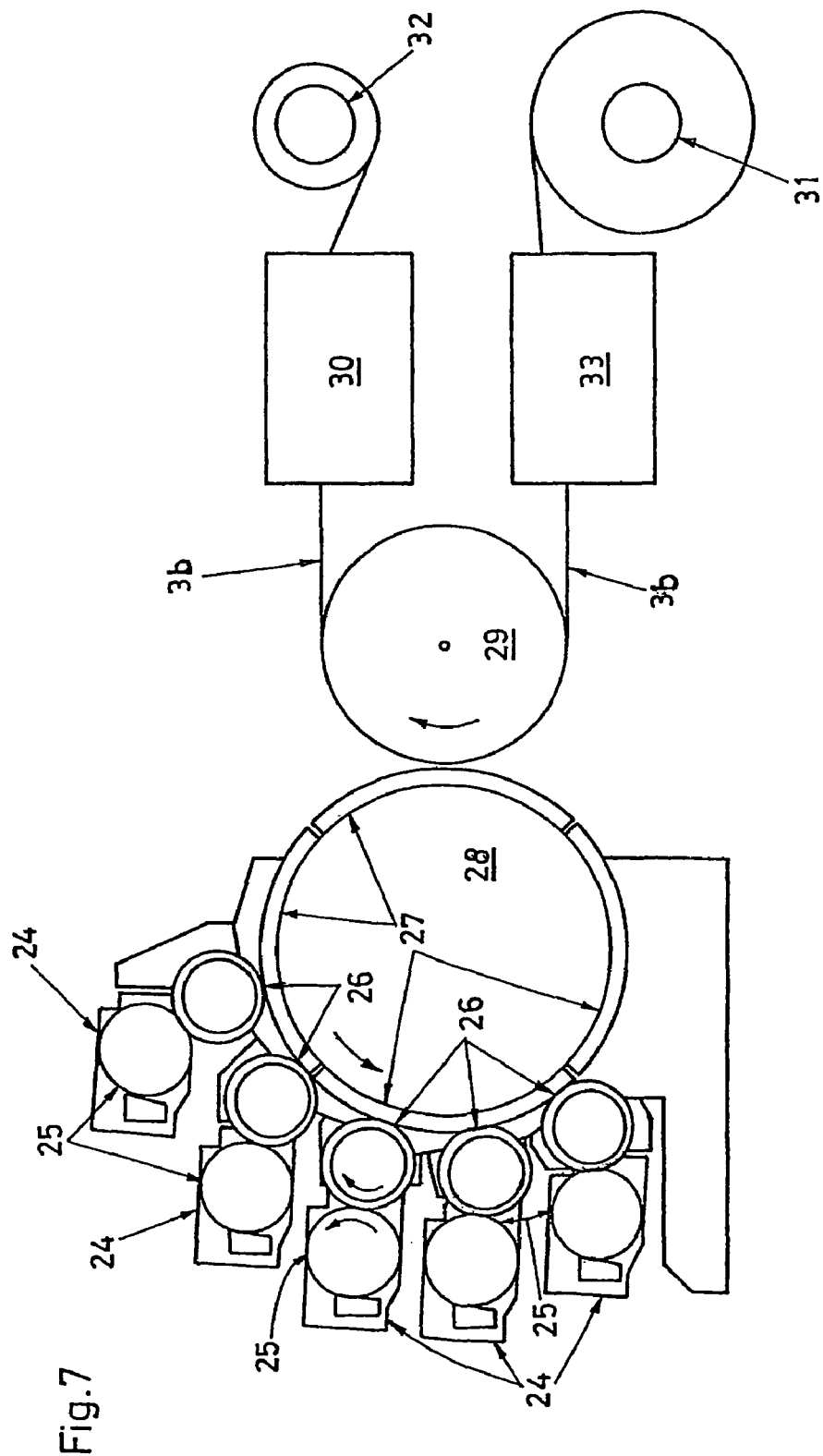
FIG. 7 is a schematic illustration of a printing device for imprinting a film web.

FIG. 7 shows an approach in which a printing step is carried out using a transfer method. Performing this, at least one, but preferably various colors from wetting receptacles 24 reach by way of gridded rollers 25 printing type forms 26 or drums, and from there transfer surfaces 27 or rubber blankets. From the transfer surfaces, the wet on wet applied colors reach the film web 3b in a single step. The transfer surfaces 27 are situated on the peripheral surface of the support drum 28, and the film web 3b is brought into contact with the transfer surfaces 27 by a pressure drum 29.

If now the partial prints are applied wet on wet onto a transfer surface, for example a rubber blanket or a transfer cylinder, the whole print image can be transferred to the film in a single step and without any coincidence problem. It is only a transfer group and one drying device 30 which are needed. The drying device 30 may optionally also include an applying device for a protective lacquer. The film web 3b is unwound from a first coil 31 to a second coil 32. In some cases, a pretreatment device 33 may be provided in which, for example, the backside of the film is provided with a primary coat and/or a sealing layer.

Figure 8:
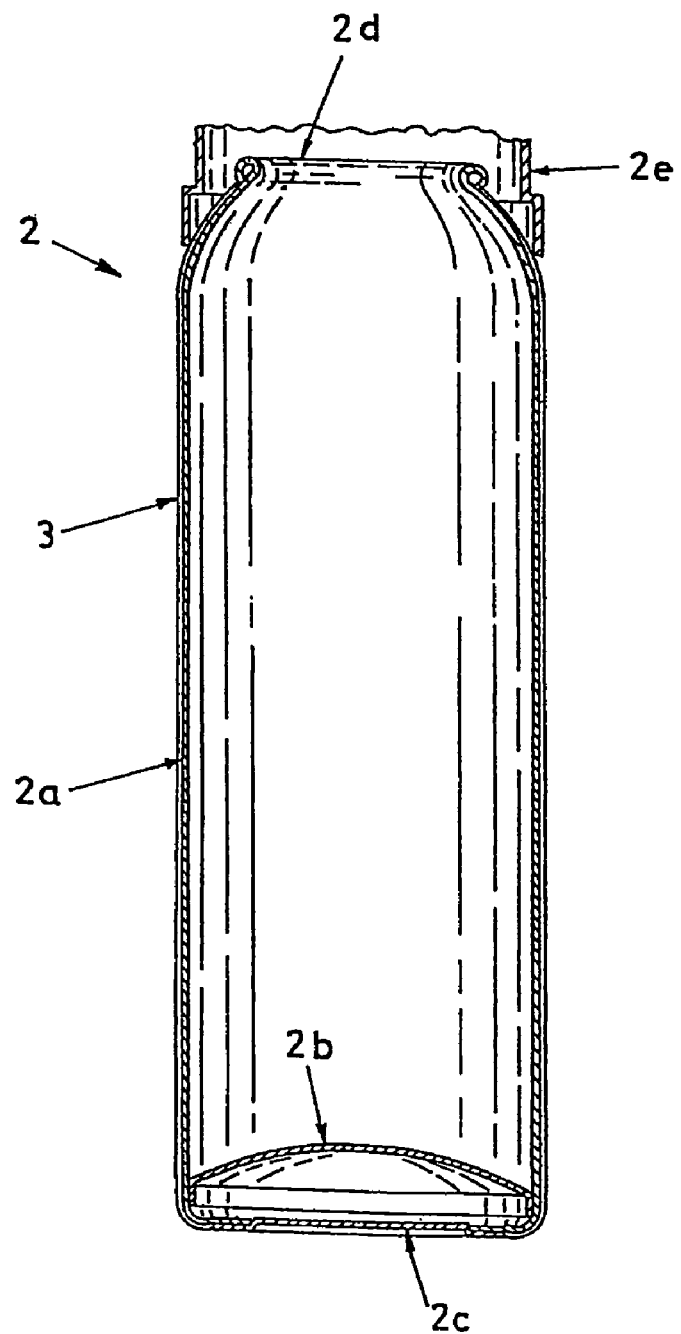
FIG. 8 shows a cross-section of can body of an aerosol can.

FIG. 8 shows the can body 2 of an aerosol can, the can body 2 being composed of a peripheral portion 2a and a bottom portion 2b. It will be understood that the can body may equally be formed integral. The view to the connection between the bottom portion 2b and the peripheral portion 2a is masked by a base covering 2c. At the upper end of the can body 2, a valve seat 2d is formed by a jolted contraction and by forming at the opening. The peripheral portion 2a is provided with a decorated film 3 in accordance with the process described above. The decorated film 3 is, for example, shrunk after narrowing the upper can end and extends, in particular, substantially up to the end edge of the peripheral portion 2a so that the film end, after forming the opening, is clamped firmly in the formed can edge.

If the decorated film 3 does not extend up to the upper can edge, an upper cover part 2e may be arranged on the upper can portion which covers the upper end area of the decorated film 3. If the can body 2 is formed of three parts, an upper obturation part including the valve seat has to be fixed to the peripheral portion 2a. According to the prior art, this is done using a folding seam or, in some cases, by welding (EP 208 564 B1). The unattractive seam region, thus created, between the upper obturation part and the peripheral portion 2a may be covered by the upper cover part 2e. In the case of an aerosol can, the upper cover part 2e is a part connected to the valve which, after inserting the valve is always on the can. By providing cover parts 2c, 2e, three-partite cans may be provided where the consumer cannot recognize that the can body 2 is composed of different parts. In principle, all known connection types may be used for tightly connecting can parts.

In the embodiment of FIG. 8, the bottom portion 2b is connected to the peripheral portion 2a by an annular welding connection. At the bottom, an edge region of the bottom portion 2b extends towards the peripheral portion 2a, engaging the lower edge of the peripheral portion 2a. The welding connection may be groove-shaped or may be in the contact area of these two portions. It will be understood that the portions may also be welded together in a butted way, that at least one of the connections may be formed as a saddle joint, or that a connection is provided only below or only above. Without using an upper obturation part, the peripheral portion 2a has to be narrowed very considerably for forming a valve seat which, with various materials, involves high expenses, particularly including many individual jolting steps, and in some cases insurmountable problems. Due to the possibility of an obturation, an optimized composition of the can body may be chosen without showing a negative appearance.

The base covering 2c, and optionally also the upper cover part 2e, may be used for protecting and firmly clamping the lower or the upper film edge of the decorated film 3. In this way, the risk of a decorated film 3 becoming detached is substantially reduced. Welding seams in longitudinal direction of a can may also be covered by a decorated film 3. A peripheral portion of a can, which is formed by bending and welding together, particularly by laser welding, may obtain a special shape already by the cut to size of the composed parts. Since the material of the metal flat material formed to constitute the periphery is not hardened by forming steps, the periphery may be shaped, at least in some regions, by changing the circumference. In this way, esthetically attractive cans may be shaped which may be provided with a shrinking decorated film 3 either prior to or after the forming step. If structural elements are arranged between the peripheral portion 2a and the decorated film 3, cans having special effects can be provided. Thus, a variety of new design possibilities will result.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. Method for producing a can body, comprising:
   cutting a film piece from a film web;
   winding the film piece on a winding mandrel from its leading edge to its trailing edge and holding the film piece in a somewhat overlapping manner on the winding mandrel;
   transferring the film piece from the winding mandrel to a concave inner surface; and
   sealing an overlapping area of interengaging film areas of the leading edge and the trailing edge with one another on the concave inner surface and thereby creating a closed film envelope.

2. Method according to claim 1, wherein the concave inner surface is formed on a holding device, and that the closed film envelope, subsequent to the sealing of the overlapping area, is brought from the concave inner surface onto a can body and is attached to the can body at least in part by at least one shrinking procedure.

3. Method according to claim 2, wherein after sealing, the winding mandrel and the holding element together with the closed film envelope and subsequently the can body and the holding element together with the closed film envelope are moved in an axial direction relative to each other so that the closed film envelope is arranged around the can body and is brought into contact with the can body by a first shrinking procedure at least in an annular area.

4. Method according to claim 2, wherein for sealing the overlapping area of the interengaging film areas, a convex pressing surface is pressed against the concave inner surface, while achieving a sealing pressure and a sealing temperature in the overlapping area, heat needed to seal the overlapping area being supplied from the concave inner surface.

5. Method according to claim 3, wherein the closed film envelope is completely shrunk to the can body in a second shrinking procedure outside the holding element.

6. Method according to claim 1, wherein for sealing the overlapping area of the interengaging film areas, a convex pressing surface is pressed against the concave inner surface, while achieving a sealing pressure and a sealing temperature in the overlapping area, heat needed to seal the overlapping area being supplied from the concave inner surface.

7. Method according to claim 6, wherein the convex pressing surface is actuated by an actuation device and wherein the convex pressing surface is at least one of broader than the overlapping area, resilient and of a material that is unable to form an adhering connection with the sealing layer.

8. Method according to claim 1, wherein for carrying out a connection procedure, heat is applied at least to a partial area of the film piece transferred to the can body, so that a sealing connection between the film piece and the can body is achieved.

9. Method according to claim 1, wherein the can body, includes:
   a film piece, extending around the periphery of the can, including at least one sealing layer wherein interengaging film areas are sealed to each other in an overlapping area, the film piece being formed as a shrinking film, while having different abilities to shrink in the two main directions, and engaging everywhere the can body directly, and thus free of adhesive, wherein the direction of greater ability to shrink extends in peripheral direction of the can body.

10. Method according to claim 9, wherein the film piece is printed on its backside and has at least one of a sealing layer on the printed layer and a thickness of less than 25 μm.

11. Method according to claim 9, wherein the film piece extends in the bottom region of the can body up to an outer annular area of the can base and an external base covering is arranged on the base in such a manner that it overlaps the film edge.

12. Method according to claim 1, further comprising:
   imprinting said film web with at least one printing step using a transfer method, wherein at least one color is transferred to a transfer surface and in a single step as a transfer printing layer to one side of the film web.

13. Method according to claim 12, wherein one side of the film web is provided with at least one of a preprint and a sealing layer already prior to said printing step using a transfer method, the transfer printing layer and the preprint being applied to different sides of the film web.

14. Device for applying a film piece to a can body comprising:
   at least one receiver for holding a can body;
   feeding means for feeding film pieces;
   at least one winding mandrel onto which film pieces may be wound adhering thereto in such a way that their respective leading edge and their respective trailing edge are held on the winding mandrel in somewhat overlapping relationship;
   at least one sealing device to be heated;
   at least one holding device, including a concave inner surface, moveable relative to the winding mandrel in such a manner that at least a partial area of the film piece including the leading edge and the trailing edge of the film piece are transferable from the winding mandrel to the concave inner surface, wherein a pressure surface renders the interengaging film pieces of an overlapping area between the leading edge and the trailing edge able to be pressed to the concave inner surface, the at least one sealing device renders a sealing procedure for connecting the overlapping area releasable, and the concave inner surface is moveable relative to the can body so that a cylindrical closed film piece may be supplied to the can body and is engageable at least in part to the can body.

15. Device according to claim 14, wherein the convex pressure surface is moveable by an actuation device, the convex pressure surface being at least one of broader than the overlapping area, resilient and of a material that is unable to form an adhering connection with the sealing layer.

16. Device according to claim 15, wherein the at least one sealing device includes a sealing surface to be heated, which faces the convex pressure surface at the concave inner surface, to which an insulation zone joins in peripheral direction.

17. Device according to claim 14, wherein the at least one sealing device includes a sealing surface to be heated, which faces the convex pressure surface at the concave inner surface, to which an insulation zone joins in peripheral direction.

18. Device according to claim 14, the device comprises at least one turning station, which includes a receiver means for holding can bodies on a circular line at equal distances, a winding mandrel and holding device including a concave inner surface being associated to each receiver means.

19. Device according to claim 14, further comprising at least one shrinking means for carrying out a shrinking procedure by supplying heat to at least a partial area of the film piece transferred to the can body.

20. Device according to claim 14, further comprising connection means for carrying out a connection procedure that renders heat able to be supplied to at least a partial area of the film piece transferred to the can body, so that a sealing connection is achieved between at least a partial area of the film piece and the can body.

* * * * *